Aug. 20, 1963 G. T. LANZ 3,101,040
APPARATUS FOR MANUFACTURING STABLE PELLETED FOODS
Original Filed July 15, 1957 3 Sheets-Sheet 1
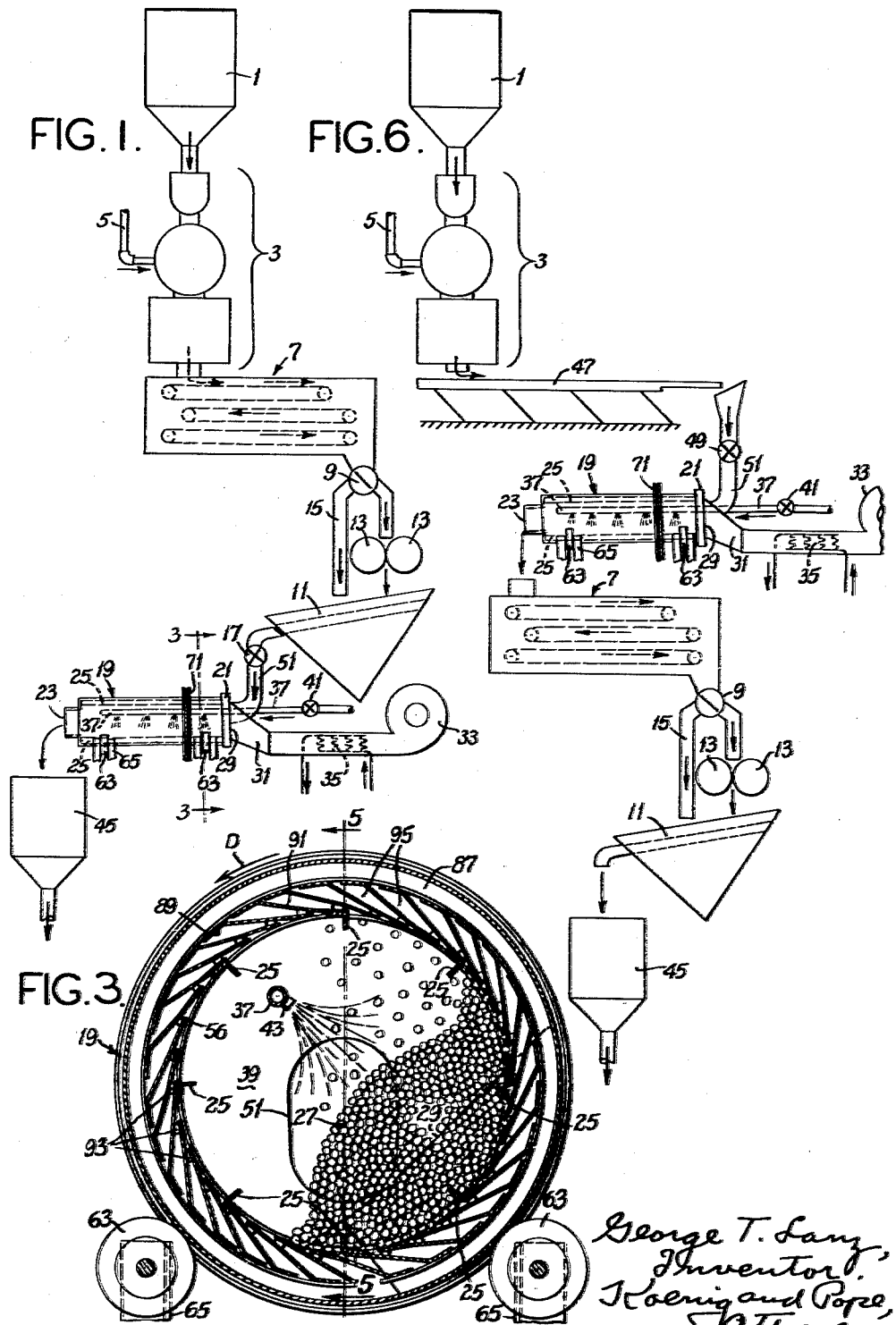

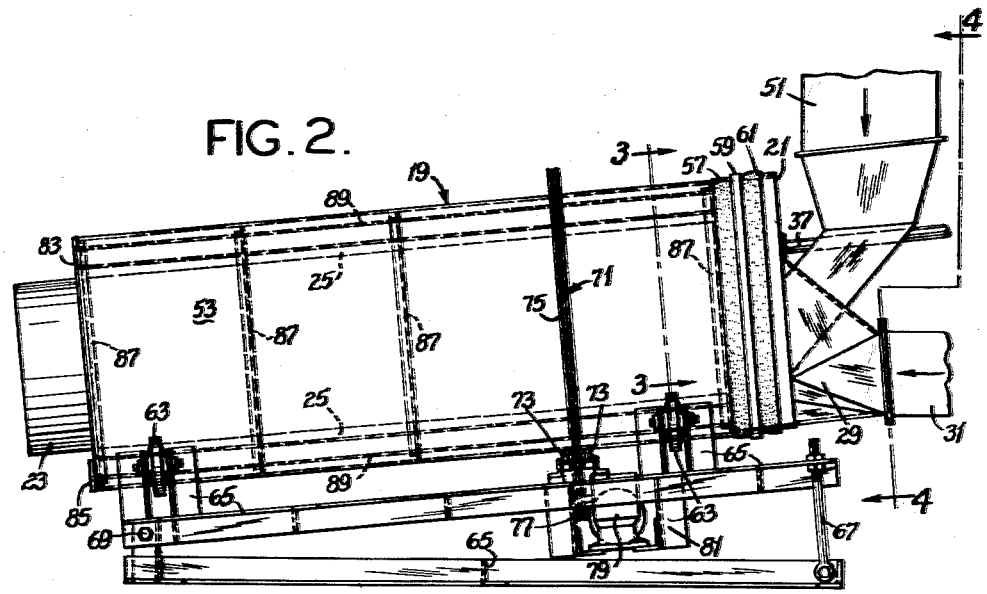
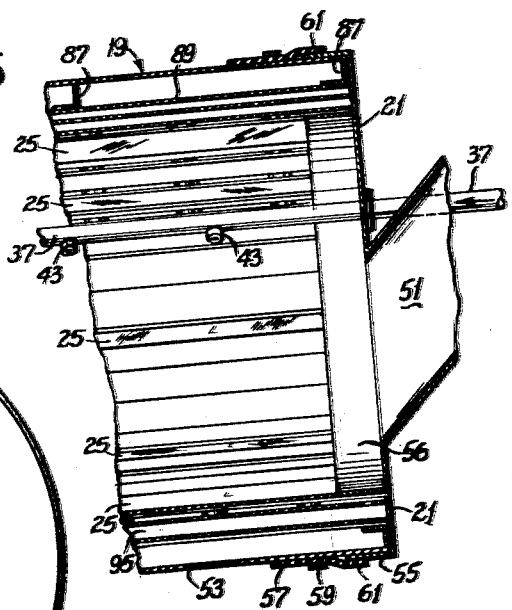
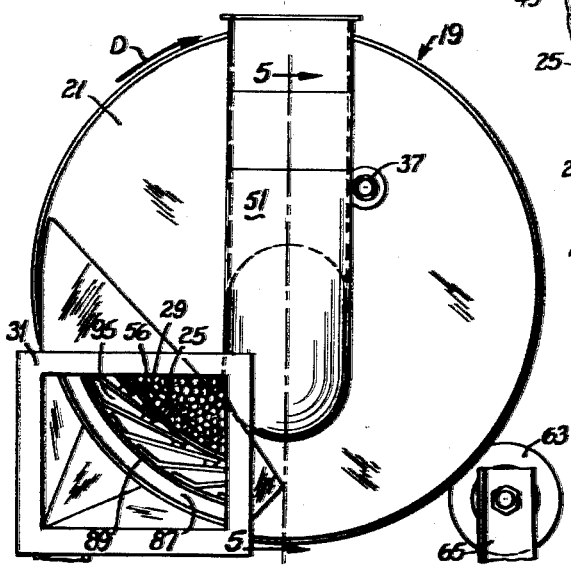

Aug. 20, 1963 G. T. LANZ 3,101,040
APPARATUS FOR MANUFACTURING STABLE PELLETED FOODS
Original Filed July 15, 1957 3 Sheets-Sheet 3
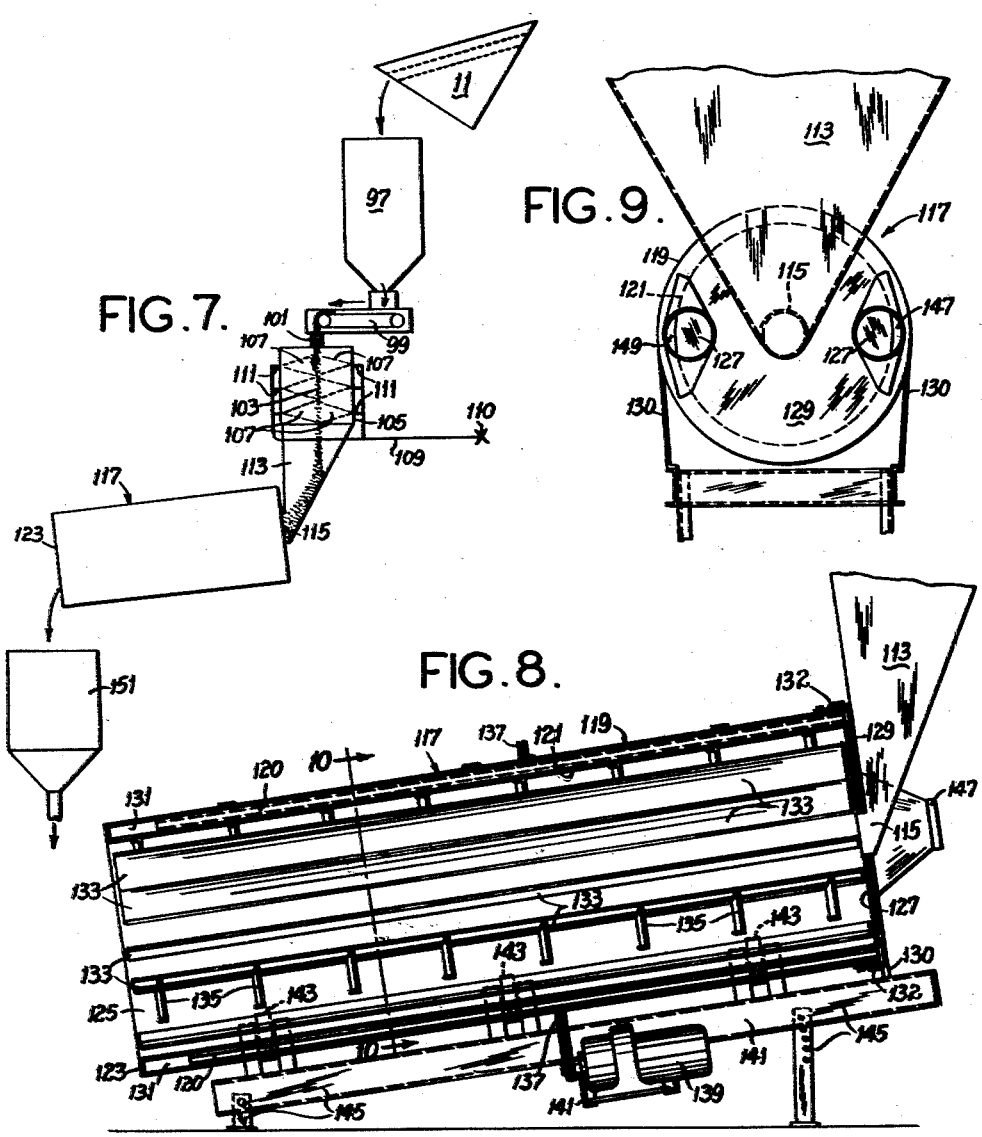
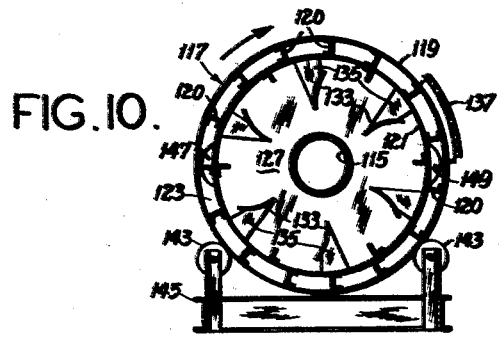

United States Patent Office 3,101,040
Patented Aug. 20, 1963

3,101,040
APPARATUS FOR MANUFACTURING STABLE PELLETED FOODS
George T. Lanz, Kirkwood, Mo., assignor to Ralston Purina Company, St. Louis, Mo., a corporation of Missouri
Original application July 15, 1957, Ser. No. 671,782. Divided and this application June 26, 1958, Ser. No. 744,736
13 Claims. (Cl. 99—235)

This application is a division of my application Serial No. 671,782, filed July 15, 1957, now Patent 2,945,764, for Method of Manufacturing Stable Pelleted Foods, and relates more particularly to the apparatus therein referred to.

Among the several objects of the invention may be noted the provision of efficient heating, spraying and tumbling apparatus for manufacturing food pellets having additives and providing a substantially higher additive content than was heretofore obtainable; the provision of apparatus of the class described which will produce stronger food pellets of high energy content by first flashing off moisture from the compressed pellets during a tumbling operation and impregnating them while hot with hot liquid fat; and the provision of reliable nonclogging apparatus of the class described which is simple in form and convenient to control. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is a flow chart illustrating my new process, said chart incorporating diagrams of apparatus required;

FIG. 2 is an enlarged side elevation of a certain drum shown in FIG. 1, said drum being also used in an alternative form of the process shown in FIG. 6, which is to be referred to below;

FIG. 3 is a cross section taken on lines 3—3 of FIGS. 1 and 2;

FIG. 4 is a right end view of the parts of FIG. 2, being viewed from line 4—4 on said FIG. 2;

FIG. 5 is a vertical fragmentary section taken on line 5—5 of FIG. 4;

FIG. 6 is a flow chart illustrating a variation in the process;

FIG. 7 is a flow chart illustrating another variation in the process;

FIG. 8 is a longitudinal section of an alternative form of drum, useful for the process illustrated in FIG. 7;

FIG. 9 is a left-end view of the drum as shown in FIG. 8; and,

FIG. 10 is a cross section taken on line 10—10 of FIG. 8.

Corresponding reference characters indicate corresponding parts throughout the several views of the drawings.

While the present invention has particular application to the production of pelleted feeds having fat additives for animals such as poultry and cattle (depending upon the size and composition of the pellets), it will be understood that it is applicable to pelleted human or other foods, insofar as the required additives present the same processing problems. The description that follows, however, concerns the addition of fats, either animal or vegetable, to poultry and cattle feeds, and more particularly to the former having a preferred pellet diameter of a fraction of an inch such as, for example, 5/32 inch or so. In the case of animal feeds, the diameter may be on the order of an inch or so.

Heretofore the addition of fats to pelleted feeds has been carried out by stirring loose, finely divided or comminuted feed components, usually with some moisture, while at the same time adding, as by spraying, the fat additive in the form of a liquid or vapor. The resulting material was then pelleted under pressure. However, upon the addition of only a nominal amount of fat (for example, 1%–4% or so by weight of feed) the resulting pellets readily became physically unstable by softening, so that during transportation, either in bulk or in packages, they tended to disintegrate, thus losing their pelleted form before being used. In order to reduce such disintegration, the amount of fat added was minimized. This of course reduced the energy content of the feed that might otherwise have been obtained by adding more fat.

According to the present invention, it is possible to produce a pellet having a much higher percentage of fat content (for example, 10% or more by weight) without disintegration occurring during shipment and before feeding. Thus the pellets produced according to my invention are harder and have more physical stability and a much higher energy content, besides being in a more desirable condition for ingestion.

Referring now more particularly to FIG. 1, there is shown at numeral 1 a supply bin for the comminuted food material or meal to be pelleted. For example, in the case of a poultry feed this might be ground corn, oats, alfalfa meal, wheat, barley or the like, with suitable additives such as vitamin and antibiotic supplements, trace chemicals or the like. In the case of animal feed this may be any suitable ground fodder with supplements. This list is to be taken as suggestive and not as limiting.

Meal, such as above suggested, flows from the bin 1 to a conventional pellet mill 3 for pelleting. This mill includes a steam connection 5 for moistening or conditioning overly dry meal or feed for proper pelleting. If the feed has a sufficient moisture content for pelleting, this addition of steam may be unnecessary. The pellet mill 3 is conventional and under pressure produces, for example, short cylindric pellets in the case of poultry feed, about 5/32 inch in diameter and 1/4 inch long, more or less. Other shapes and sizes are contemplated, depending upon the pelleting characteristics of the mill 3.

During the pelleting process in the pellet mill 3, the material is squeezed through dies which substantially compress and heat it, the compression resulting in formation of vermicular strands which are automatically cut to pellet length. The pellets may be ejected from the mill at a temperature on the order, for example, of 180° F. At this time they are in condition to hold their shape during further handling in the process.

From the pellet mill, the pellets pass to a tempering pellet drier 7 in which they are subjected to a blast of warm air. The drier may be of any conventional type, a multipass type being shown. This results in holding the pellets at a temperature of, for example, 90–120° F., which is a temperature above that of certain hot liquid fat to be applied to the pellets and to be referred to below. This temperature also results in drying the pellets.

From the pellet drier the pellets pass to a two-way control valve or gate 9. The gate 9 may be adjusted to direct the pellets to a conventional shaking screen 11, either directly through a by-pass 15, or via a set of cracking rolls 13. If they move over the by-pass 15, they retain their pelleted form, whereas if they pass through the cracking rolls they are cracked into fractional pelleted form. In either event they are herein referred to as pellets. The screen is of suitable mesh to eliminate fines and undesirably small particles.

The screened pellets pass through a control gate 17 in a passage or chute 51 and through a stationary head 21 of a downwardly sloping rotating tumbler drum assembly 19. The lower end 23 of the drum assembly is open and interiorly it contains lifting flights 25, so that the pellets are rolled over and over as they pass down from the head 21 to the outlet end 23. As shown in FIG. 3, there will be a tendency for the main mass 27 of the pellets to aggregate on one side of the drum assembly at the head 21. At this agregation area of the head 21 there is provided an air inlet 29 with which is connected an air duct 31 from a fan 33. In the duct 31 are suitable heating means 35 such as a set of steam coils adapted to bring the air temperature up, for example, in the range of 200°–300° F., with 250° F. preferred in the case of the use of animal fat. This hot air becomes introduced into the pellet aggregate 27 and circulates through it, tending to flash off any moisture, thus drying the pellets, particularly on their surfaces. It also maintains the pellet temperature at a value higher than the melting temperature of fat to be applied, as will appear below.

At numeral 37 is shown a supply pipe, passing through the head 21 and extending along the inside of the drum assembly in the open area not occupied by the aggregate 27. This open area is shown at 39. The pipe 37 is povided with an inlet valve 41 for controlling the flow of hot liquid fat through the pipe 37. For example, this fat may be on the order of 110°–130° F. temperature, with 120° F. preferred in the case of the use of animal fat. The pipe contains axially spaced spray nozzles 43 for spraying the hot fat across the drum assembly. Thus it coats evenly the surfaces of the flash-dried tumbling pellets passing through the drum assembly 19. The fat is rapidly absorbed into these dry surfaces and enters the interstitial spaces between the interior constituent particles of the pellets.

From the open lower end 23 of the drum assembly 19, the fat-impregnated particles pass into a bin 45 for subsequent passage to suitable packaging means (not shown) such as bag-filling machinery. Ordinarily they are left to cool naturally in the bin. However, if desired, they may be artificially cooled before reaching the bin.

In FIG. 6 is shown a second method and apparatus wherein like numerals designate like parts. In this case the pellets emerging from the pellet mill 3 pass first to an oscillating screen 47 of the type known as a scalper, which also eliminates fines and excessively small particles. Then the pellets pass into the drum assembly 19 via its stationary head 21. This is done through a control gate or valve 49. In the drum assembly they are sprayed with the hot fat, as already described in connection with FIG. 1. The drum assembly has connected therewith the air supply and hot-fat spraying elements already described and indicated by similar reference characters in FIG. 6. From the lower end 23 of the drum assembly (in FIG. 6) the fat-treated pellets pass to and through the drier 7 and thence through gate 9 and either through cracking rolls 13 or by-pass 15 to the screen 11. From the screen 11 the treated pellets pass to the bin 45 and then to the packers, as above described.

The method according to FIG. 6 may be characterized as a hot method, in that the heat in the pellets due to treatment in the pellet mill is not tempered prior to the time that they reach the drum assembly 19, the tempering step being reserved for application to the pellets after they emerge from this drum assembly 19.

The temperatures above given are suggestive and are not to be taken as limiting. They apply to the use of animal fat such as tallow, grease or fish oil for spray application of the pellets. It will be understood that vegetable fats may also be employed, such as soybean oil, cottonseed oil, or palm kernel oil or the like, and that somewhat different preferred heating temperatures may be required for the vegetable oils.

Since an important element of the invention is the application of the hot-fat spray to the pellet surfaces while themselves hot and after they have been pressed into form and flash-dried (rather than as formerly to their constituent meal before pelleting), and since the drum assembly 19 accomplishes the flash drying and fat application, further details of the drum assembly are disclosed as follows:

The drum assembly 19 is constituted by an outside cylinder or drum 53 which has a rotary running fit within a stationary flange 55 attached to the head 21, as shown in FIG. 5. At this point a cotton web sealing ring 57 is held in position on the end of cylinder 53 by means of a strap 59, a lip 61 extending over the flange 55 and forming a running seal. The head 21 has a second stationary, inwardly spaced flange 56.

The drum 53 is supported upon idling rollers 63, carried upon a sloping framework 65. Slope may be adjusted by means of the adjustment rod 67. Pivoting of the upper portion of the framework 65 then occurs at pivot 69 with respect to the lower portion thereof. A sprocket 71 is carried on the drum 53, the sides of which are engaged by rollers 73 to prevent axial movement of the drum 53. A chain 75 engages the sprocket 71 and a second sprocket 77 on the shaft of a driving motor 79, the latter being carried on a bracket 81 slung from the underside of the upper portion of the framework 65. Thus the motor 79 rotates the drum 53 through the sprocket and chain drive 71, 75, 77. At its lower end, the drum is partially enclosed by an inwardly directed annular flange 83, from which extends the open outlet 23 in the form of a snout. A clean-out gate 85 is provided in the flange 83.

Welded to the inside of the drum 53 are a series of annular angle-iron hoops 87, to which are welded the elongate flanges 89 of elongate imbricated baffle plates 91. Each of the baffle plates 91, including its portion 89, extends throughout most of the length of the drum 53, i.e., from flange 83 to flange 56. Each baffle plate 91 carries lugs 93 at spaced intervals on its outer margin. Thus the margin of each baffle plate is prevented by its lugs from engaging the margin of the adjacent baffle plate, so that any air that may be introduced axially under pressure between the baffle plates may escape in a peripheral direction to enter the interstices within the pellet aggregate where the latter rests upon the baffle plates 91 (see FIG. 3). Every fourth baffle plate has welded thereto one of the axially extending lifts 25. These lifts during drum rotation are covered by the aggregate 27 and tend successively to expose the pellets to the spray issuing from the nozzles 43.

An examination of FIG. 4 will indicate that the hot air inlet 29 is in such a position on the stationary head 21 as to introduce air axially into the spaces between the baffle plates 91. These spaces are numbered 95 (FIGS. 3, 4 and 5). The rotation of the drum 53 (see the outside darts D in FIGS. 3 and 4) is such, relative to the direction of imbrication of baffle plates 91, that the pellets do not tend to be introduced from aggregate 27 into the spaces 95, each baffle plate 91 shielding the other against such action. The few pellets that may accidentally enter this space will ultimately find their way down to the lower end of the drum and can be removed through the clean-out door 85.

Operation of the drum is then as follows: Pellets enter the head through the passage 51 and flow over the flange 56 onto the baffle plates 91, finding their way down along the drum on the inside margins of the baffles. The lifting flights 25 tend to aggregate them on one side of the drum, as shown at 27, while at the same time moving them for successive exposure to the oil spray from the nozzles 43 by raining the pellets down past the nozzles. Hot air entering the inlet 29 is introduced into the spaces 95 between the baffle plates 91 in the region within the drum where these baffle plates are under the pellet aggregate 27. Since the spaces 95, are enclosed at the lower end of the drum by the annular flange 83, and at the other end of the drum by the stationary head 21, this air can escape from the spaces 95 primarily only by passing through the mass aggregate 27, which has the effect of flash-drying the surfaces of the pellets and some portions of them under their surfaces. Then when they are completely exposed to the hot-fat spray by action of the lifts 25, the surfaces are in a hot dry absorbent condition rapidly to attract and to absorb a susbtantial amount of hot fat. Since in the flash-drying process the pellets are given a substantially hardened structure which the absorbed fat does not tend to break down, the pellets emerging from the lower end 23 are of the improved nature desired; that is to say, they have an absorbed quantity of fat which is very substantially greater, without weakening the pellets, than was heretofore possible to incorporate therein by the old process of applying the fat before pelletizing. Upon cooling, the fat solidifies and most, if not all, disintegrating action is avoided.

FIG. 7 illustrates a third embodiment of the invention, incorporating a modification in part of the process illustrated in FIG. 1. In this embodiment the materials are first subjected to the actions of the devices 1, 3, 5, 7, 9, 11 and 13 or 15, as described in connection with FIG. 1. Of these members, the screen 11 is repeated in FIG. 7. No control gate such as 17 is employed at the outlet of the screen 11 (FIG. 7). Instead, the pellets, which are still sufficiently warm from the tempering device 7 preferably to be above the liquid-fat temperature, pass directly from the screen 11 to a bin 97. This bin may be small and employed primarily to regulate surges, or it may be large enough to provide some storage capacity. Then the material, while still sufficiently warm and dry, passes over a belt feeder 99 and downward through a nosepiece 101, so constructed that its trajectory is in the form of a more or less flat relatively thin curtain-fall 103, preferably of uniform width and thinness. The feeder may be of the conventional so-called gravimetric type which transmits a signal showing at all times the rate at which material is passing over the belt. Being known, further description is unnecessary.

The criterion for the curtain form is that it shall, during free fall of the pelleted material through a containing box 105 around the curtain, expose most if not all of the pellets (whole or cracked) to a spray or mist 107 of the liquid fatty material such as above described. This spray or mist is obtained by supplying the hot liquid fat under pressure over a line 109 to opposed batteries 111 of spray nozzles on opposite sides of the curtain. The supply may be controlled from valve 110 in accordance with the amount of pelleted material passing over the belt conveyor 99. The nozzles are so placed that all available curtain area on both of its sides is covered by the spray as the pellets tumble past it. Inspection doors (not shown) may be employed on the box 105.

The fat-impregnated warm pellets then fall out of the open bottom of the box 105 into a connected hopper 113, so constructed that its sides are steep enough to prevent build-up of the material therein. From the lower end or chute 115 of the hopper 113, the material flows into a heating drum 117. This drum, unlike the drum 19, contains within it no spraying elements but only heating and tumbling means. The drum 117 is located on a sloping axis with respect to which the curtain-fall is transversely positioned.

The drum 117 is illustrated in FIGS. 8–10. It is constituted by spaced outer and inner cylinders 119 and 121, joined by a lower annular head 123, leaving a central lower outlet 125 from the inner cylinder 121. The cylinders 119 and 121 are held in spaced relationship by spaced longitudinal ribs 120, which extend short of the head 123 so as to leave a lower annular space shown at 131. These ribs 120 form air flues between them. At the upper end of the drum is an inner head 127, attached to the inner drum 121 and rotatable therewith. Outside is a stationary head 129 held in place by supports 130. Head 129 has a running outside seal 132 with the outer cylinder 119. The lower hopper end 115 extends through central openings in the heads 127 and 129, so as to deliver material into the inside of the cylinder 121 as both cylinders 119 and 121 rotate. This material, as the drum rotates, is subject to the stirring action of axially arranged paddles 133, which are carried upon supports 135 welded to the inside of the inner drum 121. The drum is rotated by a chain drive 137 from a motor 139 suspended on a frame 141. The frame carries rollers 143, which rotatably support the drum. The drum is prevented from sliding downward by means such as described in the case of drum 19, but not detailed in FIGS. 8 and 10. An adjustable supporting framework for the drum and motor is indexed 145.

At numeral 147 is shown a hot air inlet and at 149 is shown a warm air outlet. These are on opposite sides of the drum and connect with the space between cylinders 119 and 121 through the stationary head 129. Hot air is introduced into the inlet and traverses the length of the drum between cylinders 119 and 121 and, after passing through the annulus 131, returns between the cylinders to the warm air outlet 149. Thus the pellet temperature is maintained sufficiently high that the sprayed-on fat will remain in liquid condition during mixing and agitation in the drum. As the pellets are agitated or mixed, they absorb the liquid fat and proceed downward through the drum. From the drum outlet 125 they drop into a bin 151, from whence they proceed upon cooling to a packaging station. This third form of the invention has the particular advantage that there is less lag upon starting and ending a production run in getting all of the pellet output impregnated, since this method more rapidly exposes all pellets to the fat spray.

It is to be noted that in all forms of the invention the tempering unit 7 functions as a drier for driving off moisture. The drying action, among other things above mentioned, serves to prepare the pellets for better cracking action by rollers 13, in all forms of the invention.

The following are exemplary of the improvements accomplished by means of the invention. Poultry pellets have been produced which, according to standard tests, are 300% harder for a 10% by weight fat content than pellets made by former processes having only a 4% or less fat content. Heretofore, pellets containing more than about 3% of fat by weight have been rendered practically useless, or at least much inferior as pellets, by disintegration during shipment. While I do not wish to be restricted by any explanations for this result, I believe it is due to the fact that when fat was formerly applied to the comminuted unpelleted and cool granular material it preliminarily coated the particles to form barriers against good coalescence during pelleting with resultant weakening of the pellets after pelleting. The more fat was added, the more they were weakened. This placed a low limit upon the amount of energy-producing fat additive that could be introduced without causing the pellets to disintegrate during storage and transportation. On the other hand, according to my process, the feed particles are pelleted in the absence of any fat barriers, the fat being applied after coalescence by pressure and flash-drying and heating has occurred. The free flowing fat then readily enters a strong structure by absorption into the interstices between the coalesced dried particles and does not interfere with the dried pressure-produced bonds between the constituent particles of the respective pellets. The application of hot fat to the hot dry particles is important, inasmuch as this brings into operation an attraction of hot fat into the pellets by absorption without entailing later disintegration after the fat has cooled.

In the above, it will be understood that the members 11 (FIGS. 1 and 7) and 47 (FIG. 6) both act as riddles to eliminate small broken pieces and fines from the pellets or acceptably sized parts thereof.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A tumbler for hot pelleted and like material comprising a sloping drum, said drum having concentric walls, an annular head connecting the walls adjacent the lower end of the drum and forming a seal therebetween, means spacing said walls and forming longitudinal air flues extending partly down the drum so as to leave an annular connecting space between the ends of the flues at the lower end of the drum and said annular head, means adapted to introduce said material at the upper end of the drum, and spaced inlet and outlet means at the upper end of the drum communicating on opposite sides of the drum with different ones of said flues as they pass said inlet and outlet means.

2. A tumbler made according to claim 1, including paddle means supported upon and within the inner one of said concentric walls.

3. A tumbler made according to claim 2, wherein said paddle means consists of axially arranged members carried upon axially spaced supports.

4. Food preparing apparatus comprising means adapted to form pellets from the food and including heating means for said pellets, a chamber adapted to receive the heated pellets with a free fall therethrough, means adapted to spray the heated pellets with a liquid fatty substance in said chamber as they fall, an agitator adapted to receive said pellets from the chamber after said fall to agitate them, and means for heating said agitator.

5. Apparatus according to claim 4, including means forming said free fall of pellets as a thin curtain, said spray means directing liquid particles crosswise of and into the curtain from opposite sides thereof.

6. Apparatus according to claim 4, wherein said free fall of pellets is in the form of a flat thin curtain, and wherein said agitator is constituted by a sloping rotating drum containing agitating paddles and adapted to receive at its upper end the pellets from the bottom of the free fall, said drum having a surrounding jacket adapted for circulation of a heating fluid for heat transfer to the pellets in the drum.

7. Apparatus according to claim 6, wherein said jacket is imperforate.

8. Apparatus for treating pelleted foods comprising a drum located on a sloping axis, an enclosing head at the upper end of the drum, said head having an opening therein spaced from its sidewise margins, a sloping chute connected with said opening for the introduction of a flow of pellets through the head into the sloping drum, the lower end of said drum having an outlet opening for gravity flow of pellets therefrom, lifts spaced around the inner wall of the drum and extending substantially along its length, means adapted to rotate the drum around said sloping axis, whereby the pellets are lifted and dropped for gravitational progress down the drum from the chute to said outlet, said enclosing head being stationary and provided with a peripheral running seal with the upper end of the drum, said drum having concentric walls, an annular head connecting the walls at the lower end of the drum and forming a seal therebetween, axial dividers between said walls extending from said enclosing head to points short of said annular head to provide a peripheral passage at the lower end of the drum, means forming a passage through one portion of said enclosing head for the introduction of hot air between said drum walls, and means forming a passage for the escape of air from between said drum walls through another portion of said enclosing head.

9. Apparatus for treating pelleted foods comprising a drum located on a sloping axis, an enclosing head at the upper end of the drum, said head having an opening therein spaced sidewise from its margins, a chute connected with said opening for the introduction of pellets, the lower end of said drum having an outlet opening for gravitating movement therefrom of the pellets, and spaced lifts on the inner wall of the drum and extending along its length, each lift comprising a longitudinally extending element and axially spaced supports therefor supporting it at a distance from the inner wall of the drum, said drum comprising a pair of spaced concentric cylinders connected at the lower end of the drum by an annular head, a plurality of axially directed dividers between said cylinders extending from the upper end of said drum to a point short of said annular head, means adapted to introduce hot air between said cylinders and certain of the dividers from an opening in one marginal portion of said enclosing head, and means adapted to permit escape of air from between said cylinders and certain others of the dividers from an opening through another marginal portion of said enclosing head.

10. Apparatus for treating pelleted foods comprising a drum located on a sloping axis, an enclosing head at the upper end of the drum, said head having an opening therein spaced from its sidewise margins, a sloping chute connected with said opening for the introduction of a flow of pellets through the head into the sloping drum, the lower end of said drum having an outlet opening for gravity flow of pellets therefrom, lifts spaced around the inner wall of the drum and extending substantially along its length, means adapted to rotate the drum around said sloping axis, whereby the pellets are lifted and dropped for gravitational progress down the drum from the chute to said outlet, said head being stationary and provided with a peripheral running seal with the upper end of the drum, the wall of said drum being constituted by spaced cylinders connected at their lower ends, axial dividers between said walls extending from said head at the upper end of the drum to points short of the connection between cylinders to provide a peripheral passage at the lower end of the drum, means forming a passage through one portion of the head for the introduction of hot air between said drum walls, means forming a passage for the escape of air from between said drum walls through another marginal portion of the head, a substantially horizontal belt conveyor located at an elevation above said chute adapted to carry and drop pellets in the form of a curtain entering the chute, and means adapted to spray liquid fat on the pellets at a location between said conveyor and said lower outlet.

11. Apparatus for treating pelleted foods according to claim 10, wherein said curtain is surrounded by an enclosing box, and spray nozzles in the walls of the box on opposite sides of the curtain adapted to spray liquid fat onto opposite sides of the curtain as it passes from the conveyor to the chute.

12. Food preparing apparatus comprising means adapted to form pellets from the food and including heating means for said pellets, means for dropping said pellets in the form of a relatively thin curtain, an enclosing chamber surrounding said curtain, spray nozzles connected with said chamber for spraying liquid fat on the curtain as the pellets fall through said chamber, and means for receiving said pellets from the chamber after their fall through the chamber.

13. Food preparing apparatus according to claim 12 wherein said means for receiving said pellets is an agitator adapted to agitate the pellets after their fall through the chamber.

(References on following page)

References Cited in the file of this patent

UNITED STATES PATENTS

| | | | |
|---|---|---|---|
| 774,859 | Turney | Nov. 15, | 1904 |
| 981,549 | Goodlett | Jan. 10, | 1911 |
| 1,085,939 | Prindle | Feb. 3, | 1914 |
| 1,126,197 | Hogan | Jan. 26, | 1915 |
| 1,517,897 | Farasey | Dec. 2, | 1924 |
| 1,800,247 | Buckbee | Apr. 14, | 1931 |
| 2,119,910 | Terry | June 7, | 1938 |
| 2,197,792 | Brickson | Apr. 23, | 1940 |
| 2,324,874 | Peters | July 20, | 1943 |
| 2,451,096 | Kooman | Oct. 12, | 1948 |
| 2,483,630 | Erisman | Oct. 4, | 1949 |
| 2,576,952 | Lowe et al. | Dec. 4, | 1951 |
| 2,601,355 | Wyss et al. | June 24, | 1952 |
| 2,784,093 | Feld | Mar. 5, | 1957 |
| 2,806,788 | Leker | Sept. 17, | 1957 |
| 2,840,922 | Erisman et al. | July 1, | 1958 |
| 2,865,766 | Christianson et al. | Dec. 23, | 1958 |
| 2,869,482 | Britcher | Jan. 20, | 1959 |
| 2,870,547 | Teichman | Jan. 27, | 1959 |

FOREIGN PATENTS

| | | |
|---|---|---|
| 18,349 | Great Britain | of 1908 |